Jan. 2, 1934.   H. H. ROZIER   1,942,365
MACHINE FOR CUTTING OR UNROLLING THONGS OF LEATHER OR OTHER MATERIAL
Filed Jan. 6, 1933   2 Sheets-Sheet 1
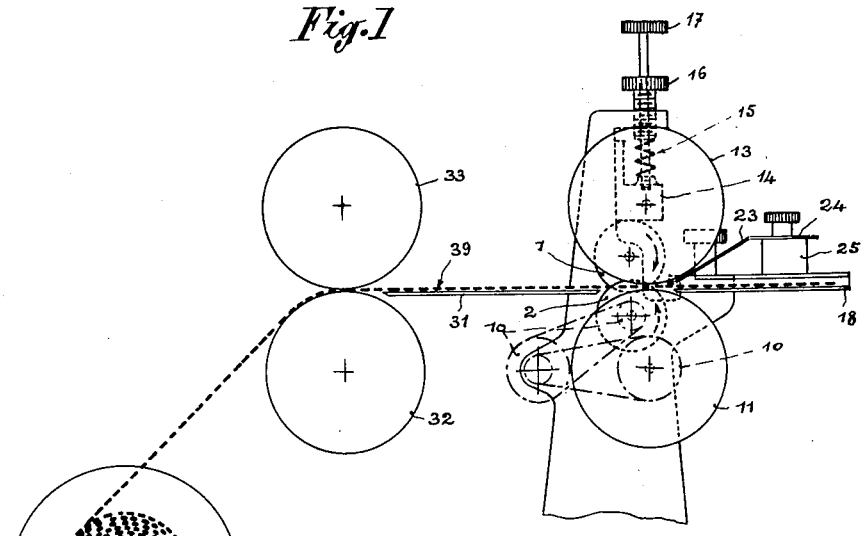
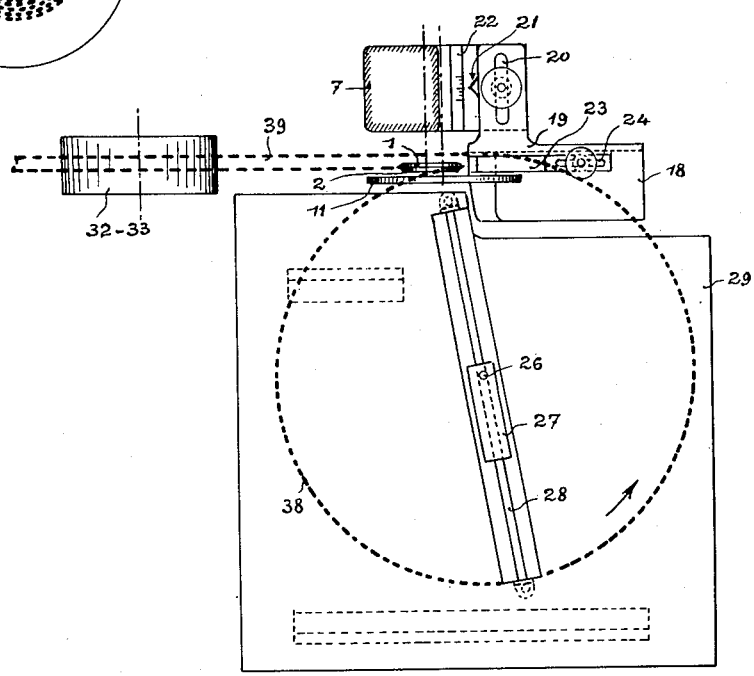
Inventor
HENRI HIPPOLYTE ROZIER
BY Haseltine, Lake & Co.
ATTORNEYS Jan. 2, 1934.  H. H. ROZIER  1,942,365
MACHINE FOR CUTTING OR UNROLLING THONGS OF LEATHER OR OTHER MATERIAL
Filed Jan. 6, 1933  2 Sheets-Sheet 2

Inventor
HENRI HIPPOLYTE ROZIER
BY Haseltine, Lake & Co.
ATTORNEYS

Patented Jan. 2, 1934

1,942,365

UNITED STATES PATENT OFFICE 1,942,365

MACHINE FOR CUTTING OR UNROLLING THONGS OF LEATHER OR OTHER MATERIAL

Henri Hippolyte Rozier, Moulins-Sur-Allier, France, assignor to Manufacture De Chaussures De Moulins Societe Anonyme, Moulins-Sur-Allier, France Application January 6, 1933, Serial No. 650,463, and in France March 16, 1932

7 Claims. (Cl. 164—37)

The present invention concerns a machine intended for cutting or unrolling, in regular strips or thongs of suitable width and in long lengths without joints, discs of leather or other material.

This machine, which enables a complete disc to be cut up into a single thong, is of the type which works round from the periphery to the centre of the disc.

Its action is simple, its operation and adjustment easy, and its rate of production high.

In this machine the disc to be cut up is given a rotating motion, caused by pressure wheels or drums on its periphery, round an axis which is itself susceptible of free movement in the direction of the cutting organs, in such a way that the periphery rests constantly and automatically in contact with the shoulder of a guide provided with a pressure blade which, by its flexibility, adapts itself to the irregularities of thickness of the discs of leather or other material which is to be unrolled.

The invention will in any case be clearly understood with the assistance of the complementary description which follows, and of the attached drawings, it being well understood that this description and drawings are given merely by way of example.

Figures 1 and 2 show two elevations of the front and end respectively;

Figure 3 is a plan view;

Figure 2:
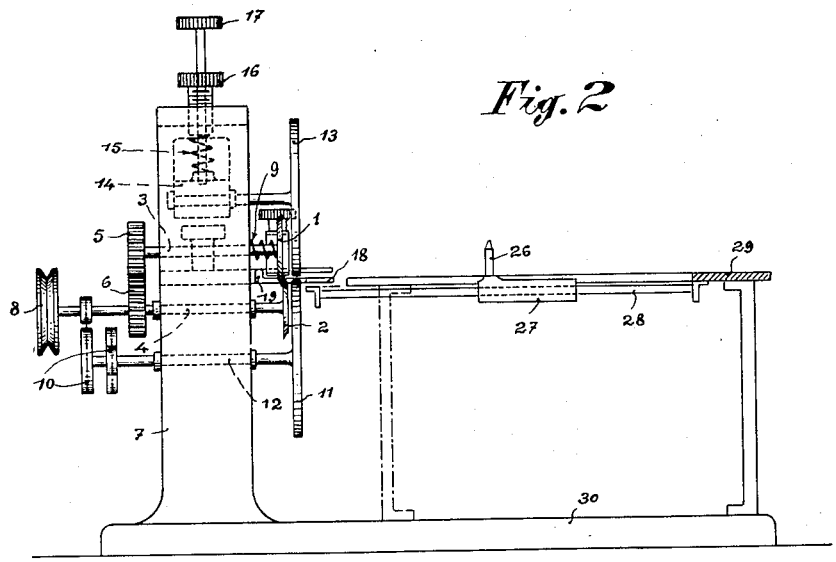

According to the form of construction represented by Figures 1 to 3, the circular cutters 1 and 2 mounted on the axles 3 and 4 connected by the gearing 5 and 6 are pivoted in the frame 7, and receive, through the pulley 8, which is attached to the driving axis 4, a movement of rotation in the direction of the arrow.

The axle 3 is able to slide in the frame 7 under the action of a spring 9, in order continually to obtain contact of the cutting edges of the cutters 1 and 2.

A driving wheel 11, fixed on the axis 12, carried in a hole bored in the frame 7, receives a suitably chosen rotary movement through the intermediary of gearing 10.

Another pressure wheel 13 is pivoted in a carriage 14, mounted on the frame on which it can slide easily. A spring 15, the tension of which is regulated by the milled knob 16, causes, through the intermediary of the carriage 14, the pressure wheel 13 to act continuously on the driving wheel 11.

The arrangement shown at 17 enables the pressure wheel 13 to be raised in order to facilitate the introduction between the two wheels of the disc 38 which is to be unrolled.

The guide 18, of which the position of the shoulder 19 relative to the cutters 1 and 2 gives the width of the thong, is adjustable in a simple slide 20 on a bracket of the frame. A pointer 21 attached to the guide, and a graduated scale 22 fixed to the frame, facilitate the adjustment.

The guide is, in addition, furnished with a flexible blade 23, mounted in a slide 24 on a boss 25 of the guide 18. The blade 23 adjusts itself automatically by bending to the thicknesses, often irregular, of the disc of leather to be unrolled, and maintains the latter perfectly flat in the guide as close as possible to the point of cutting.

At 26 is shown the axis around which turns the disc of leather to be unrolled. This axle 26 is mounted on a carriage 27 which slides freely on a slide 28 on a hollow of the table 29. This slide 28 is inclined in a horizontal plane relative to the vertical plane passing through the discs 11 and 13 in such a way as to form, with this latter, an acute angle in the direction of rotation of the disc.

The above mentioned table, on which is placed the disc to be unrolled, is adjustable on the support 30 in order to obtain the position of the slide 28 relative to the driving wheel 11, which gives, during unrolling, contact of the periphery of the disc on the shoulder 19 of the guide 18.

The delivery plate 31 prevents the thong getting wound round the moving parts.

The rollers 32—33, driven at the same speed as the driving wheel 11 by a transmission which is not shown, regulate the draw-off of the thong 39.

The reeling apparatus 34 is of the usual friction type.

The action of the apparatus is as follows:

The disc of leather 36, pierced at the centre, is threaded on the axle 26. It rests on the table 29. It is then entered between the driving wheel 2 and the pressure wheel 13 by actuating the knob 17, and then under the blade 23 by simple sliding.

The machine being started up, the disc of leather commences to revolve and, due to the position of the axle 26 relative to the driving system 11—13, its periphery comes against the shoulder 19 of the guide 18, adjusted for the desired width.

The disc then unrolls continuously until its centre is reached.

It is obvious that the invention is not limited to the form described, which is given by way of example, but that it can be carried out in accordance with any variation based on the same principle, and that the subject of it may serve for other uses than the unrolling of discs of leather.

Figures 4, 5:
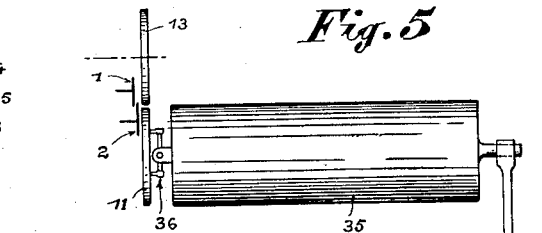
Figures 4, 5 and 6 are schematic views similar to the preceding ones for the case where the material to be cut up is taken in the form of a cylinder instead of a disc.
Figure 6:
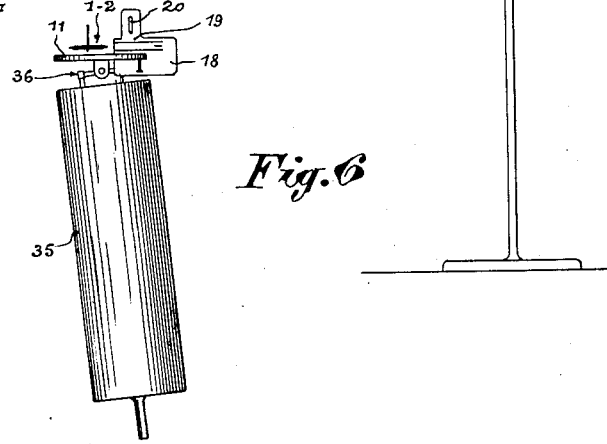

It is possible, for example (Figures 4 to 6), to replace the table 29 and the slide 27—28 by an inclined roller 35 receiving its motion from the wheel 11 through the medium of a Cardan drive 36.

The machine thus arranged unrolls a thong from a cylinder 37 fashioned from a skin of rectangular shape, the two opposite edges of which have been previously cemented together.

What I claim and desire to protect by Letters Patent is:

1. A machine for cutting and uncoiling a continuous thong from the periphery of a piece of leather or other material, comprising the combination, with cutting means supported upon a stationary frame and an adjustable stationary guide upon said frame spaced from said cutting means upon one side of the same, of a pair of guide rollers supported on said frame and disposed adjacent the other side of said cutting means in order to grip and continuously displace said piece of material toward said stationary guide, and horizontally disposed guide members mounted upon said frame adapted to support said material, which guide means provides an axis about which said material may rotate, and is independently angularly adjustable at will in a horizontal plane to make various angles with respect to the cutting means in order to solely thereby determine the width of the thong being cut.

2. A machine for cutting and uncoiling a continuous thong from the periphery of a flat piece of leather or other material, comprising the combination, with a pair of opposed rotary cutters supported upon a stationary frame and an adjustable stationary guide upon said frame spaced from said cutters upon one side of the same, of a pair of guide rollers supported on said frame and disposed adjacent the other side of said cutters in order to grip and continuously displace said piece of material toward said stationary guide, and a horizontally disposed guide member provided with a centering pin for said piece of material and mounted on said frame, the centering pin upon said guide member being freely movable upon said member toward said guide rollers, while the guide member is angularly adjustable at will in a horizontal plane to make various angles with respect to the cutters in order to solely thereby determine the width of the thong being cut.

3. A machine according to claim 1, wherein the adjustable stationary guide is provided with a shoulder with which the periphery of the material to be cut makes contact, and wherein a resilient member presses the material adjacent to the cutters down upon the stationary guide.

4. A machine according to claim 2, wherein the adjustable stationary guide is provided with a shoulder with which the periphery of the material to be cut makes contact, and wherein a resilient member presses the material adjacent to the cutters down upon the stationary guide.

5. A machine according to claim 1, wherein one of the guide rollers is rotatable in situ while the other roller is mounted in a vertically shiftable bearing which is urged downward by a manually adjustable compression spring so as to cause said other roller to resiliently bear down upon the material to be cut against said first roller.

6. A machine according to claim 1, wherein the horizontally disposed guide means comprises a supporting roller whose one end is supported by a horizontally shiftable bearing, so that the axis of the supporting roller may be shifted to make different angles with the cutting means.

7. A machine according to claim 2, wherein the horizontally disposed guide member with its centering pin is interchangeable with a supporting roller having a horizontally shiftable bearing at one end in order to cut strips from cylinders of the material to be cut.

HENRI HIPPOLYTE ROZIER.